United States Patent [19]

Dettling, Jr.

[11] Patent Number: 5,401,047
[45] Date of Patent: Mar. 28, 1995

[54] POWER LIFT HITCH DEVICE

[76] Inventor: Mathias Dettling, Jr., 201 3rd Ave. SW. Box 1295, Watford City, N. Dak. 58854

[21] Appl. No.: 154,929

[22] Filed: Nov. 19, 1993

[51] Int. Cl.$^6$ .............................................. B60D 1/46
[52] U.S. Cl. ................................. 280/479.1; 280/490.1; 280/493; 254/425
[58] Field of Search ....................... 280/493, 477, 478.1, 280/479.1, 490.1, 511, 405.1, 407, 407.1, 500; 254/13, 85, 418, 419, 424, 425, 92, 98, 103, DIG. 2

[56] References Cited

U.S. PATENT DOCUMENTS

| | | | |
|---|---|---|---|
| 2,327,308 | 8/1943 | Johnston | 280/490.1 |
| 2,493,405 | 1/1950 | Hedgpeth | 280/490.1 |
| 2,741,484 | 4/1956 | Fisher et al. | 280/490.1 |
| 3,523,698 | 8/1970 | Bishop | 280/766.1 |
| 3,830,522 | 8/1974 | Boucher | 280/490.1 |
| 3,843,163 | 10/1974 | Hale | 280/478.1 |
| 3,891,239 | 6/1975 | Leo et al. | 280/490.1 |

Primary Examiner—Margaret A. Focarino
Assistant Examiner—Anne Marie Boehler
Attorney, Agent, or Firm—David A. Lingbeck

[57] ABSTRACT

This invention relates to a power lift hitch device comprising a frame fixedly attached to the underside of a vehicle near the rear end thereof and further comprising an elongate member having an end rotatably attached to the frame and having an extension member for selective adjustment rearward of the vehicle, and further comprising a motor connected to gearing which is connected to a threaded elongate rod extending downwardly therefrom and threaded through the elongate member for raising and lowering one end of the elongate member to connect to a tongue member of a pullable device to be towed or moved. The motor can be remoteably energized to drive gearing which drives and rotates the threaded elongate rod either clockwise to raise or lift the end of the elongate member or counter clockwise to lower the end of the elongate member to the ground for conveniently and easily hitching to the tongue member of the pullable device.

3 Claims, 5 Drawing Sheets

POWER LIFT HITCH DEVICE

BACKGROUND OF THE INVENTION

This invention relates to a power lift hitch device which fixedly mounts to the frame of vehicles such as pickup trucks and the like for lifting the tongue members of and towing pullable means behind the vehicles.

Hitches of different types are well known in the art. However, upon review of the prior art, none of the hitches describes, suggests, or anticipates the power lift hitch device described in the present invention.

One known prior art is a POWER HITCH, U.S. Pat. No. 4,572,315, which comprises a first and second frame elements interconnected for movement relative to the other about a vertical axis. The first frame element is attachable to the rear of a vehicle with the second frame element is detachably attachable to an implement for towing behind the vehicle.

Another known prior art is a POWER HITCH, U.S. Pat. No. 4,343,484, which comprises an upwardly extending hitch pin and a guide block disposed adjacent to the hitch pin for guiding the aperture of a trailing implement tongue immediately over the hitch pin.

Also, another known prior art is a QUICK HITCH POWER FRAME, U.S. Pat. No. 4,277,080, which comprises an elongate structural member having an essentially straight mid portion. The elongate structural member is supported outboard of the adjacent driving wheel of the tractor and its mid portion is utilized for the support of a rotary implement such as a mower.

Further, another known prior art is a POWER ASSIST HITCH FOR A HAY TRANSPORT, U.S. Pat. No. 4,046,274, which comprises a tilt cylinder fixedly attached between a frame and a bed and comprises a support structure which has an inner sleeve affixed thereto with an outer sleeve slidable over the inner sleeve with a horizontal hitch cylinder disposed within the inner sleeve and affixed between the frame and the support structure.

Also, another known prior art is a POWER DRAW BAR HITCH, U.S. Pat. No. 3,462,172, which comprises a second pivoted lever or draw bar member pivotally mounted on a conventional draw bar member of a tractor which mounts a conically shaped pin at the extremity thereof for fitting through an aperture in a coupling member of the tongues of a variety types of implements.

Another known prior art is a POWER ACTUATED TRACTOR HITCH, U.S. Pat. No. 3,432,184, which comprises a triangular coupling plate having inturned flanges along two sloping side edges, a complementary coupling plate inserted under the flanges and a plurality of elongated power-driven actuators between a tractor and the complementary coupling plate and being attached at each end with joints which permit universal movement.

The power lift hitch device is not described nor suggested by any of the prior art, and is definitely useful for the user who wants to tow a pullable means which is quite heavy and where the tongue of the pullable means is quite heavy and difficult to raise to the hitch device. Instead, the user can lower the hitch device to the tongue member of the pullable means and detachably connect the hitch device to the tongue member and raise the hitch device and the tongue member to a transport position with the hitch device being securely fastened to the bumper of the vehicle.

SUMMARY OF THE INVENTION

The present invention relates to a power lift hitch device which comprises a frame having a first support member and a second support member both of which are fastened at the ends thereof with bolts to the frame of the vehicle. The power lift hitch device further comprises a first and second bracket members spaced apart and fixedly attached or welded to the first support member and extending forward therefrom, and also comprises an elongate member fixedly attached at one end thereof to an elongate member support which is rotatably attached at either end thereof with two removeable pins to the first and second bracket members. The elongate member has an eyelet member near the front end thereof, which can be inserted through a hole in a third bracket member which is fixedly attached to and depends from the bumper of the vehicle, to securely fasten the hitch device in a transport position. A 12 volt motor is fixedly mounted to the front support member and is connected to a gear box to actuate a threaded elongate means which is threaded through the elongate member and which raises and lowers the elongate member relative to the ground and to the vehicle.

It is an object of the present invention to provide a power lift hitch device which can be easily and conveniently installed on any type of vehicle for lifting and connecting to the tongue member of a pullable means to be towed.

Another object of the present invention is to provide a power lift hitch device which can be automatically lowered substantially to the ground to hitch to the tongue of a pullable means.

Also, another object of the present invention is to provide a power lift hitch device which can be automatically lifted to a transport position with the tongue member of the pullable means connected thereto.

Further, another object of the present invention is to provide a power lift hitch device which allows the user to connect to the tongue member of the pullable means without having to lift the tongue member thereof to connect to the hitch.

Yet, another object of the present invention is to provide a power lift hitch device which substantially prevents injury to the back of the user because the user does not have to lift the tongue member of the pullable means to connect to the hitch device as with the conventional hitches of the prior art.

DETAILED DESCRIPTION OF THE INVENTION

Figure 1:
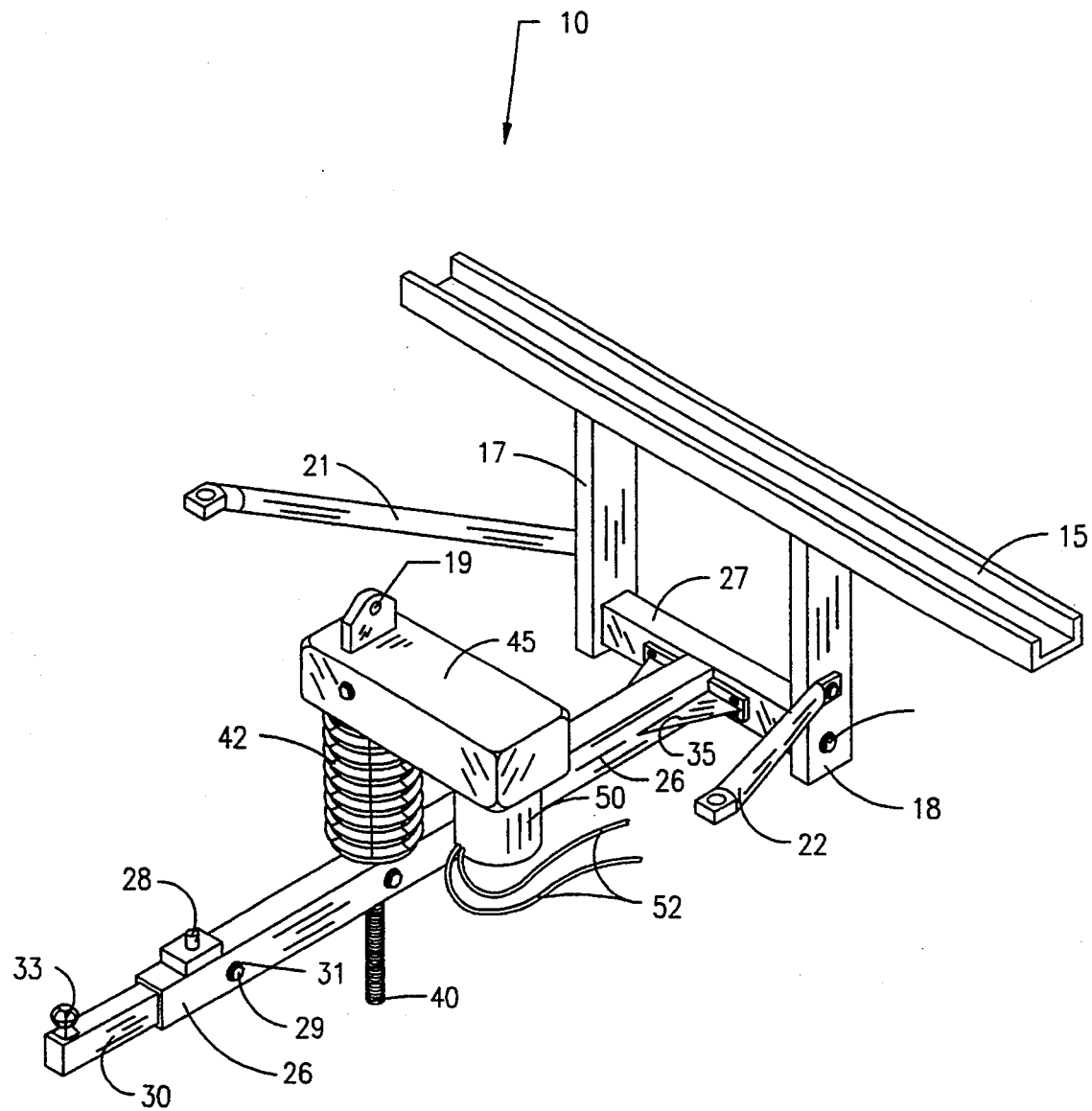
FIG. 1 is a perspective view of the power lift hitch device disposed in a transport mode.

Referring to FIGS. 1 through 5 of the drawings, the power lift hitch device 10 comprises a frame preferably made of metal and having a first support member 15 fixedly attached at the ends thereof to the frame 62 on the underside of a vehicle 60 with bolts or the like and having a second support member 16 fixedly attached at the ends thereof to the frame on the underside of the vehicle 60 near the rear end thereof with bolts or the like. Further, as shown in FIG. 1, the frame has first and second bracket members 17 & 18 which are spaced apart and fixedly attached or welded to the first support member 15 and depend downward from near the rear end of the vehicle 60. A pair of braces 21 & 22 are fixedly attached with bolts 55 or the like or welded to the two bracket members 17 & 18 and to the frame 62 of the vehicle 60 to provide stability and support to the two bracket members 17 & 18. An elongate member 26 preferably made of square metal tubing and having a front end and a back end is fixedly attached or welded to a crosspiece 27 at the front end of the elongate member 26 and extends rearwardly from the first support member 15 toward the rear end of the vehicle 60. The crosspiece 27 of the elongate member 26 is rotatably attached at the ends thereof with two insertable pins or bolts 20 to the first and second bracket members 17 & 18 for selective rotation of the elongate member 26 about the front end thereof.

Figure 2:
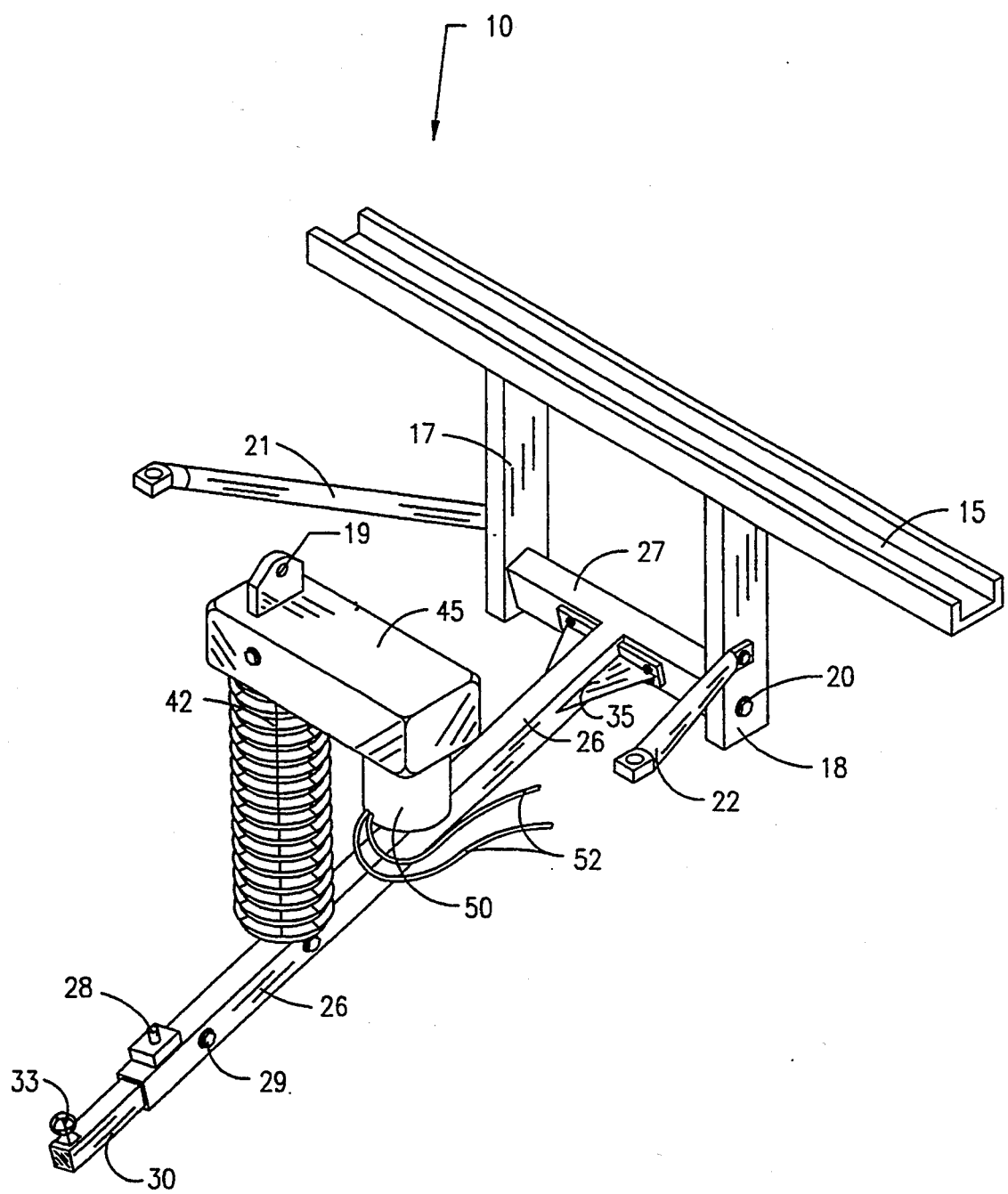
FIG. 2 is a perspective view of the power lift hitch device disposed in a lowered position for hitching to the tongue member of a wheeled vehicle.

As shown in FIGS. 1 and 2, an extension member 30 having a plurality of holes 31 therethrough and along the length thereof has a first end and a second end which slidably and lockingly extends in through the back end of the elongate member 26 to selectively lengthen the elongate member 26 to conveniently reach the tongue member 65 of the pullable means 70 for easy hookup thereto without having to position the rear vehicle 60 precisely at the front of the tongue member 65. The elongate member 26 has a hole therethrough to align to any one of the plurality of holes 31 through the extension member 30 to receive a pin or bolt 29 for locking the extension member 30 at selective lengths outward from the back end of the elongate member 26 relative to the rear of the vehicle 60. The extension member SO has a connective means near the first end thereof such as a conventional ball 33 or a conventional aperture or the like for conveniently hitching to the tongue member 65 of the pullable means 70. Further, as shown in FIGS. 3 and 4, a fastener 28 such as an eyelet or a tab member as such is fixedly attached or welded to the top side of the elongate member 26 near the first end thereof for receiving a bolt or pin to securely lock the elongate member 26 in a transport position.

Figure 4:
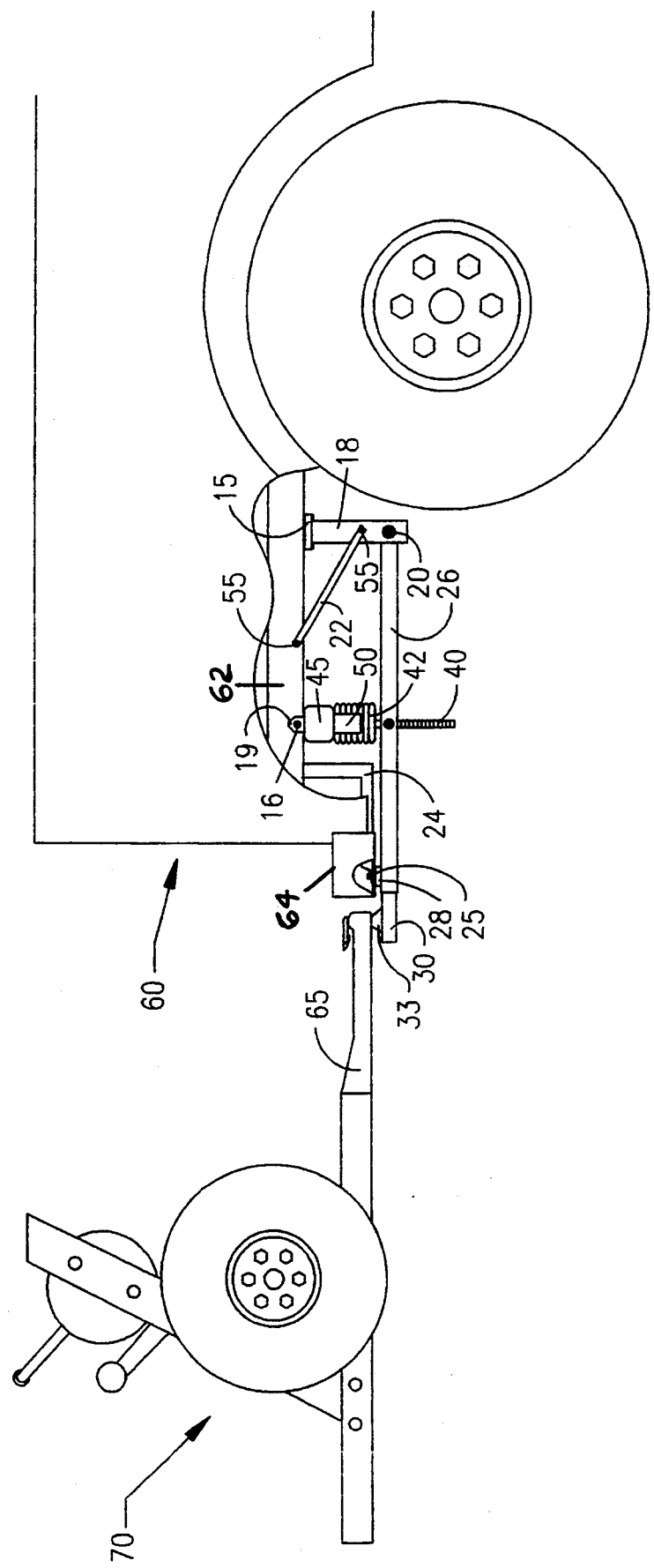
FIG. 4 is a side elevation view of the power lift hitch device showing a breakaway view of the rear of the vehicle with the power lift hitch device fixedly attached to the vehicle and disposed in a transport mode with a partial view of a wheeled vehicle and the tongue member thereof connected to the hitch device.
Figure 5:
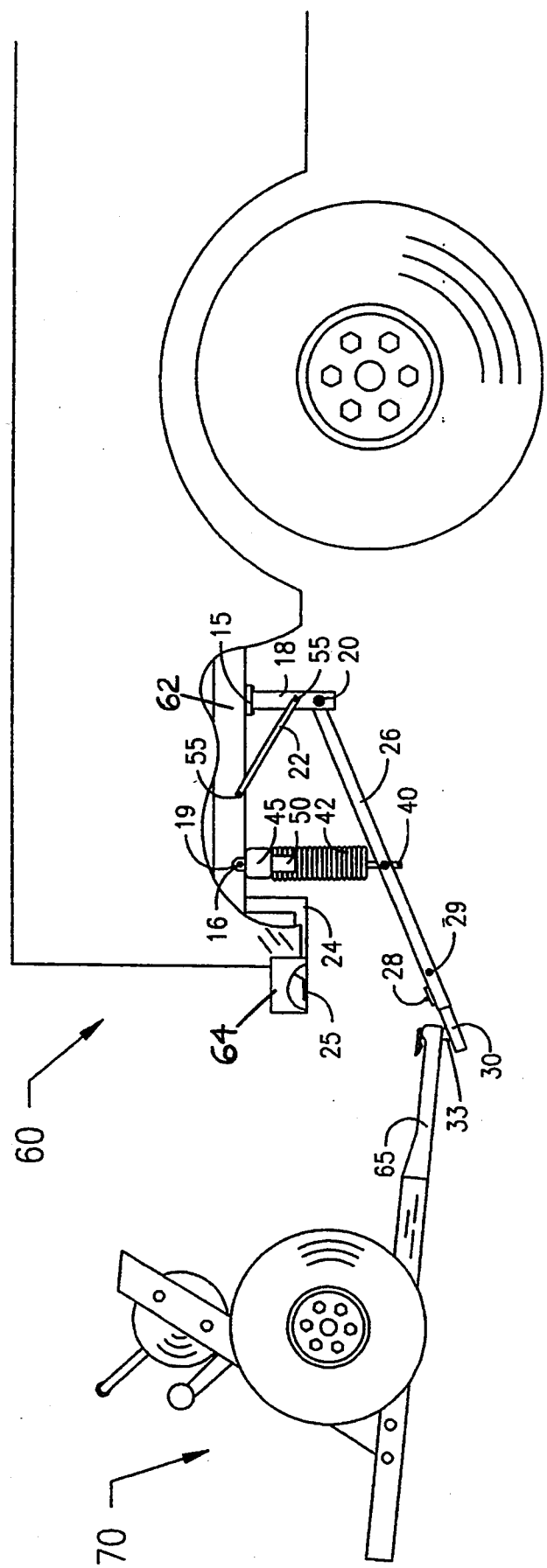
FIG. 5 is a side elevation view of the power lift hitch device showing a breakaway view of the rear of the vehicle with the power lift hitch device fixedly attached to the vehicle and disposed in a lowered position with a partial view of a pullable means and the tongue member thereof resting on the ground.

As shown in FIGS. 4 and 5, the frame has a third bracket member 24 which is fixedly attached or welded to and depends from the underside of the bumper 64 of the vehicle 60. The third bracket member 24 has a receiving member 25 fixedly attached or welded to the bottom thereof for receiving the fastener 28 fixedly attached to the elongate member 26 to lockingly secure the elongate member 26 in a transport position. The fastener 28 can be extended up through an opening in the receiving member 25 of the third bracket member 24 and can be fastened in the receiving member 25 with a bolt or the like to safely secure the elongate member 26 in a transport position.

Figure 3:
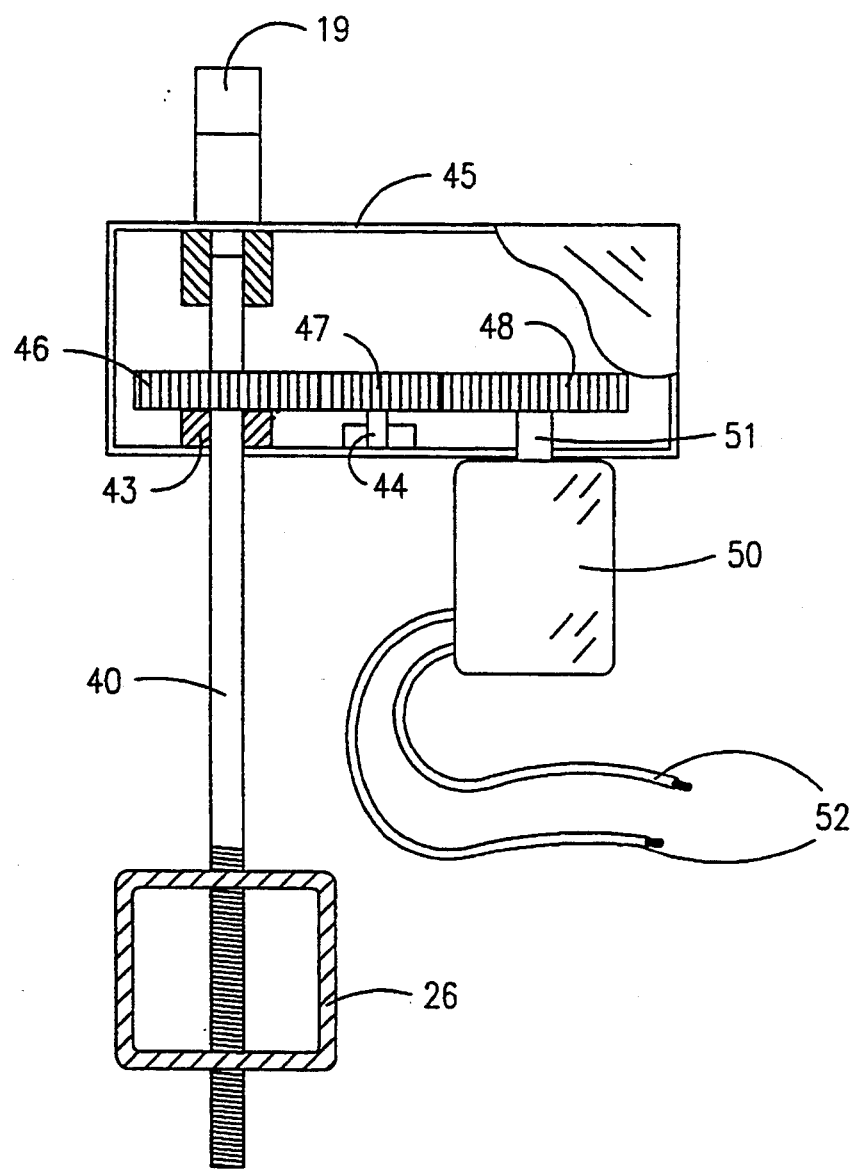
FIG. 3 is an isolated front elevation view of the motor means connected to a reduction gear in the gear box, which is meshed with another gear which is attached to the threaded elongate means which raises and lowers the tongue member.

As shown in FIGS. 3, 4, and 5, a motor means comprising preferably a 12 volt DC motor 50 is fixedly mounted with screws or bolts to the second support member 16 and has a shaft 51 which extends therefrom and which is rotatably connected to a gear means which comprises a power transfer gear 48 which is rotatably meshed with an idler gear 47 mounted upon a support means 44 and which is rotatably meshed to a reduction gear 46 mounted upon another support means 43 which provides support to the reduction gear 46 in a gear box 45. The motor means further comprises a contact switch (not shown) which is connected by a wire 52 to the motor 50 to energize the motor 50 to actuate or drive the power transfer gear 46 of the gear means which actuates or drives the idler gear 47 which actuates or drives the reduction gear 46 which is fixedly attached about the top of a threaded elongate means 40 which is preferably a threaded rod and which is vertically disposed beneath the vehicle 60 and which is threaded through the top side of the elongate member 26 and which is shrouded with a flexible protective sheathe 42, to rotate the threaded elongate means 40 either clockwise or counter clockwise to raise the extension member 30 and elongate member 26 of the power lift hitch device 10 to a transport mode or to lower the extension and elongate member 26 essentially to the ground for conveniently hitching or connecting to the tongue member 65 of the pullable means 70. The threaded elongate means 40 is dimensioned to allow the first end of the extension member 30 to essentially rest upon the ground so that the user can connect the tongue member 65 of the pullable means 70 to the connector means 32 on the extension member 30 without the user having to strain his/her back and possibly injure his/her back by lifting the tongue member 65 upward to connect or hitch the pullable means 70 to the power lift hitch device 10 as is common with the prior art and other conventional hitches.

To use the power lift hitch device 10, the user can position the rear end of the vehicle 60 adjacent to the front of the tongue member 65 of the pullable means 70 and can lower the connector means 32 on the extension member 30 downwardly to the ground by turning on the switch 51 which energizes the motor means 50 which actuates the gears 46, 47, & 48 in the gear box 45 which rotates the threaded elongate means 40 counter clockwise to lower the connector means 32 to the ground in position to connect the tongue member 65 to the connector means 32. After the tongue member 65 is connected to the connector means 32 on the extension member 30, the user can lift the connector means 32, the extension member 30, and the elongate member 26 to a lockable transport position by turning on the switch 51 which energizes the motor 50 means which actuates the gears 46, 47, & 48 in the gear box 45 which rotates the threaded elongate means 40 clockwise to raise and lift the tongue member 65 to a transport position. To secure the elongate member 26 and extension member 30 in the transport position, the user should insert a pin or bolt 29 through the fastener 28 which should be extending in through the receiving member 25 of the third bracket member 24.

Various changes and departures may be made to the invention without departing from the spirit and scope thereof. Accordingly, it is not intended that the invention be limited to that specifically described in the specification or as illustrated in the drawing but only as set forth in the claims.

What is claimed is:

1. A power lift hitch device comprising:
    a frame fixedly attached to an underside of a vehicle and having a pair of bracket members fixedly attached to and depending from a support member and stabilized beneath said vehicle, said frame also comprising another bracket member fixedly attached to and depending from a bumper of said vehicle and having a receiving member for lockingly securing an elongate member in a tranport position;
    said elongate member having a crosspiece fixedly attached at a back end of said elongate member, said crosspiece rotatably connected to said frame for pivoting of said elongate member;
    an extension member slidably extending through a front end of said elongate member and being lockingly adjustable at selected lengths relative to said elongate member, said extension member having a connector means near an end thereof for connecting to a tongue member of a pullable means;
    a threaded elongate means threaded through said elongate member for moving said elongate member relative to the ground;
    a gear means mounted to said frame and connected to said threaded elongate means for actuating the threading of said threaded elongate means through said elongate member;
    a motor means mounted to said frame and connected to said gear means to actuate said gear means.

2. A power lift hitch device as described in claim 1, wherein said crosspiece of said elongate member is rotatably connected at ends thereof to and between said pair of bracket members to raise and lower said elongate member relative to the ground.

3. A power lift hitch device as described in claim 2, wherein said elongate member has a fastener fixedly attached thereupon, which is capable of being securely locked in said receiving member of said another bracket member to secure said elongate member in a transport position.

* * * * *